A. A. LOW.
APPARATUS FOR REDUCING AND PACKING WASTE PAPER.
APPLICATION FILED SEPT. 9, 1909.
960,026.
Patented May 31, 1910.
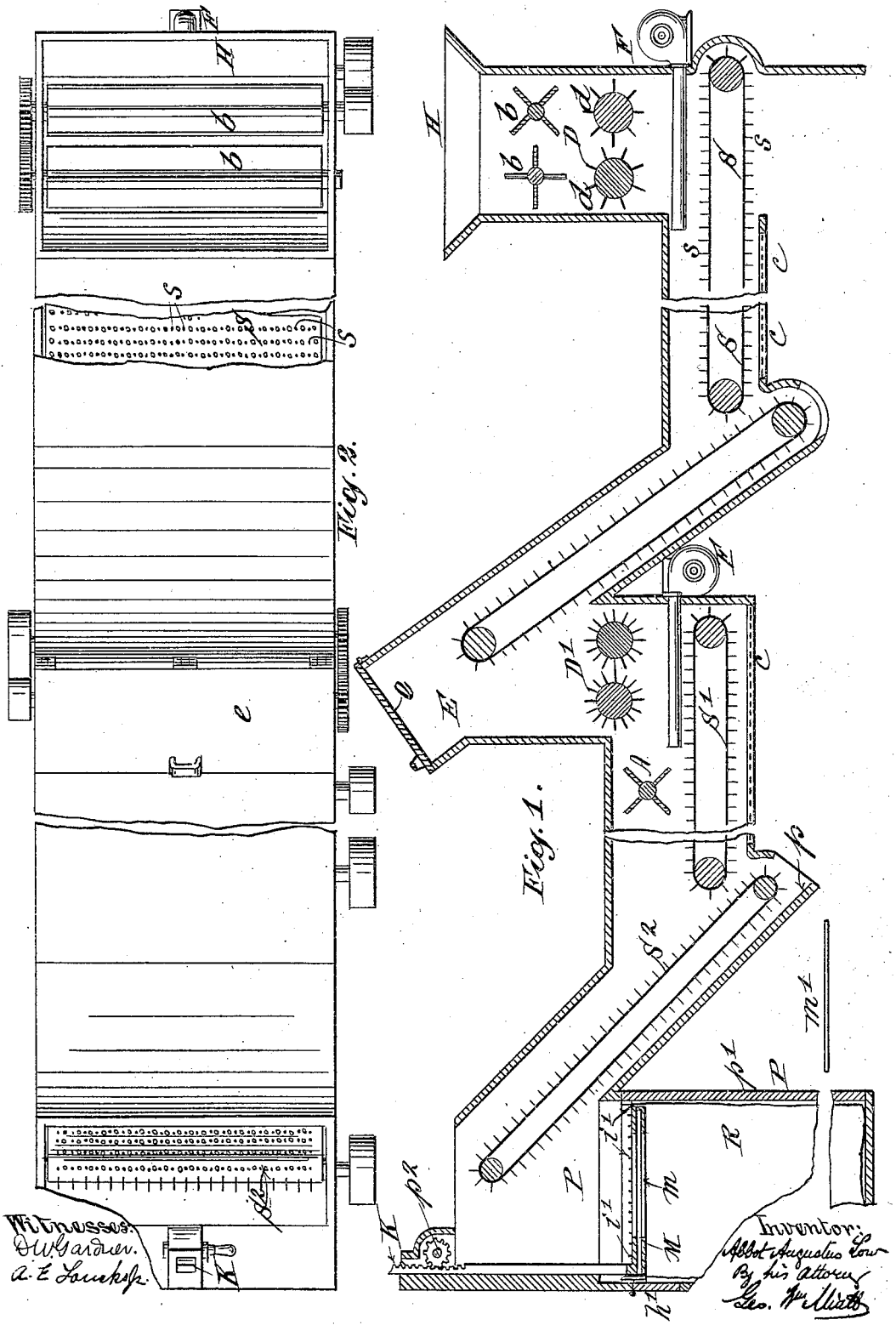

UNITED STATES PATENT OFFICE.

ABBOT AUGUSTUS LOW, OF HORSESHOE, NEW YORK.

APPARATUS FOR REDUCING AND PACKING WASTE PAPER.

960,026.     Specification of Letters Patent.     Patented May 31, 1910.

Application filed September 9, 1909. Serial No. 516,847.

*To all whom it may concern:*

Be it known that I, ABBOT AUGUSTUS LOW, a citizen of the United States, residing at Horseshoe, St. Lawrence county, and State of New York, have invented certain new and useful Improvements in Apparatus for Reducing and Packing Waste Paper, of which the following is a specification.

My improvements relate to the reduction and packing of waste paper after the manner set forth in Letters Patent No. 929,960, issued to me August 3rd, 1909, and are designed to broaden the scope of that invention and adapt it to the treatment of waste paper on a large scale in such manner as to effect the mutilation and cancellation of the paper, and render printed or written material unavailable or unintelligible for reuse or information,—at the same time affording means whereby dirt, and extraneous matter is eliminated from the reduced paper and the latter conveniently and effectually packed for storage and shipment.

The invention consists in the specific construction and arrangement of parts and appliances herein shown and described, essential features being the interposition between the disintegrating device and the packing receptacle, of means for eliminating the dust and dirt from the paper under treatment as hereinafter set forth, whereby the resultant packages of reduced paper are rendered clean and valuable for manufacturing purposes.

In the accompanying drawings, Figure 1, is a longitudinal vertical sectional elevation of apparatus embodying my invention; and Fig. 2, a plan of the same.

H, is the receiving hopper into which the paper collected from various sources is dumped, and from the bottom of which it is positively forwarded by the beaters $b$, $b$, to the disintegrating device D,—the beaters $b$, $b$, not only forwarding the paper but opening it up in good form for treatment by the primary disintegrating device. Said primary disintegrating device D, may be of any desired character adapted to shred and reduce the paper into comparatively small portions. As shown in the drawings the primary disintegrator D, consists of two opposed rotary cutters $d$, $d$, rotating in opposite directions and between which the paper is drawn centrally, reduced and shredded coarsely.

The shredded paper falls from the primary disintegrating device D, to a perforated shaker and forwarder S, provided with teeth $s$, by which the material under treatment is carried to a secondary disintegrating device D', which also may be of any well known or desired construction, but which is of such character relatively, as compared with the primary disintegrating device D, that it reduces the paper under treatment into smaller particles,—desiccating it in fact and discharging it onto a secondary perforated shaker S', by which it is transferred to the elevator and shaker $S^2$, which conveys it to the packing device P.

A, is an agitator by which the reduced paper is stirred up beaten and opened out in such manner as to facilitate the separating and eliminating of dust and dirt, and this result is further contributed to by the use of one of more fan blowers F, the air from which not only assists in agitating and removing the dust and dirt from the reduced paper, but also assists in forwarding the desiccated paper to the packing receptacle P, so that the desiccated paper is separated *en route* from any extraneous matter with which it may have been contaminated.

Screens $c$, $c$, may be arranged under the primary and secondary shakers and forwarders S, S'; and an inclined plane $p$, conducts all dirt or dust falling from the elevator shaker $S^2$, to a common dust chamber.

Finer grades of paper may be fed directly to the secondary disintegrating device D', if preferred or desirable, through the aperture E, closed normally by a cover $e$.

The packing device P, consists of an inclosed box, casing or compartment of suitable shape or construction, substantially such as that shown and described in my Letters Patent hereinbefore referred to. The inclosing box P, is provided with a door $p'$. Supported in the upper part of the box and preferably on the door $p'$, is a frame provided with hooks $i'$, or equivalent devices for the support of a receptacle R, to receive the desiccated paper. This receptacle R, may consist of a bag or equivalent, flexible holder, the mouth of which is extended and held open by the hooks $i'$.

The desiccated paper drops from the elevator $S^2$, through a central opening $m$, in the packing follower M, into the receptacle R. This opening $m$, may be closed however by a slide $m'$, when it is desired to compress the waste paper within the receptacle R, as set forth in my Letters Patent hereinbefore recited, in which case the packing follower M, is depressed and lowered into the receptacle R, as far as may be desired by means of a rack K, and pinion $p^2$, or other equivalent mechanical expedient. The slide $m'$, may be inserted to close the aperture $m$, through the medium of a door $h'$.

By my present invention I adapt the apparatus to the reduction and cleaning of waste paper on a relatively large scale, to meet the requirements of hotels, apartment houses and other situations where the disposition of waste paper is an important item, and where economy of space is a desideratum. Under ordinary conditions existing such waste paper is collected and transported loosely in bulk. By my method of treatment the waste paper is not only disintegrated and cleansed, thereby rendering it more valuable for commercial or manufacturing purposes, but I am also enabled to compress the resultant paper product into comparatively small space and compact packages for storage and transportation.

My apparatus and method may be also used advantageously upon an enlarged scale at dumping stations where refuse is to be sorted and disposed of.

It is also especially adapted for the treatment of damp, or wet paper after exposure to the weather, for instance, and this result is largely contributed to, not only by the opening up and agitation to which the reduced paper is subjected, but also by reason of the draft or drafts of air injected into the apparatus which take up and carry off moisture.

What I claim as my invention and desire to secure by Letters Patent is,

1. In apparatus for treating waste paper, the combination of the dump hopper, disintegrating mechanism arranged to receive the waste paper from said dump hopper and discharge it in shredded form upon perforated shaking and forwarding mechanism, said shaking and forwarding mechanism, arranged to receive the reduced paper and deliver it to a packing device, said packing device, and means for compressing the disintegrated paper within the packing device, for the purpose described.

2. In apparatus for treating waste paper, the combination of the dump hopper, disintegrating mechanism arranged to receive the waste paper from the said dump hopper and discharge it in shredded form upon perforated shaking and forwarding mechanism, a mechanical agitator arranged to stir the paper on said shaking and forwarding mechanism, a packing device arranged to receive the reduced paper from said shaking and forwarding mechanism, and means for compressing the disintegrated paper within the packing device, for the purpose described.

3. In apparatus for treating waste paper, the combination with the dump hopper, disintegrating mechanism arranged to receive the waste paper from said dump hopper, and discharge it in shredded form upon perforated shaking and forwarding mechanism, said shaking and forwarding mechanism, air blast mechanism arranged to forward the reduced paper over said shaking and forwarding mechanism, packing device arranged to receive the reduced paper from said shaking and forwarding mechanism, and means for compressing the disintegrated paper within the packing device, for the purpose described.

4. In apparatus for treating waste paper, the combination of the dump hopper, disintegrating mechanism, arranged to receive the waste paper from said dump hopper and discharge it in shredded form upon perforated shaking and forwarding mechanism, said shaking and forwarding mechanism, an agitator arranged above said shaking and forwarding mechanism, air blast mechanism arranged to forward the reduced paper over the shaking and forwarding mechanism, a packing device arranged to receive the reduced paper from said shaking and forwarding mechanism, and means for compressing the disintegrated paper in the said receptacle, for the purpose described.

5. In apparatus for treating waste paper, the combination of the dump hopper, disintegrating mechanism arranged to receive waste paper from said dump hopper and discharge it in shredded form upon perforated shaking and forwarding mechanism, said shaking and forwarding mechanism, a screen interposed between said shaking and forwarding mechanism, and a refuse receptacle, a packing device arranged to receive the reduced paper from said shaking and forwarding mechanism, and means for compressing the disintegrated paper within the packing receptacle, for the purpose described.

6. In apparatus for treating waste paper, the combination of the dump hopper, primary disintegrating mechanism below the same, arranged to receive the waste paper from said dump hopper and discharge it in shredded form upon perforated shaking and forwarding mechanism, said shaking and forwarding mechanism, a secondary disintegrating device arranged to receive the paper from said shaking and forwarding mechanism and deliver it to secondary shaking and forwarding mechanism, said secondary shaking and forwarding mechanism, a packing device arranged to receive the reduced paper and means for compressing the disintegrated paper in the packing device.

7. In apparatus for treating waste paper, the combination of the dump hopper, primary disintegrating mechanism, primary shaking and forwarding mechanism, secondary disintegrating mechanism, secondary shaking and forwarding mechanism, a packing device and means for compressing the disintegrated paper therein, for the purpose described.

8. In apparatus for treating waste paper, the combination of the dump hopper, primary disintegrating mechanism, primary shaking and forwarding mechanism, secondary disintegrating mechanism arranged to receive the reduced paper from the primary forwarding and shaking mechanism, means for introducing paper directly to secondary disintegrating mechanism, secondary forwarding and shaking mechanism, a packing device and means for compressing the disintegrated paper within the packing device, for the purpose described.

ABBOT AUGUSTUS LOW.

Witnesses:
D. W. GARDNER,
GEO. WM. MIATT.